US011780952B2

(12) United States Patent
Laferte

(10) Patent No.: US 11,780,952 B2
(45) Date of Patent: Oct. 10, 2023

(54) PROCESS FOR THE SYNTHESIS OF SILYLATED POLYURETHANES AND SILYLATED POLYURETHANE COMPOSITION

(71) Applicant: BOSTIK SA, Colombes (FR)

(72) Inventor: Olivier Laferte, Trosly Breuil (FR)

(73) Assignee: Bostik SA, Colombes (FR)

( * ) Notice: Subject to any disclaimer, the term of this patent is extended or adjusted under 35 U.S.C. 154(b) by 0 days.

(21) Appl. No.: 16/323,612

(22) PCT Filed: Aug. 1, 2017

(86) PCT No.: PCT/FR2017/052162
§ 371 (c)(1),
(2) Date: Feb. 6, 2019

(87) PCT Pub. No.: WO2018/029420
PCT Pub. Date: Feb. 15, 2018

(65) Prior Publication Data
US 2019/0169352 A1    Jun. 6, 2019

(30) Foreign Application Priority Data

Aug. 8, 2016  (FR) ...................................... 1657643

(51) Int. Cl.
| C08G 18/10 | (2006.01) |
| C08G 18/38 | (2006.01) |
| C08G 18/48 | (2006.01) |
| C08G 18/76 | (2006.01) |
| C08G 18/66 | (2006.01) |
| C08G 18/22 | (2006.01) |
| C09J 7/38 | (2018.01) |
| C09J 11/08 | (2006.01) |
| C08G 18/75 | (2006.01) |
| C09J 175/04 | (2006.01) |
| C08L 75/04 | (2006.01) |

(52) U.S. Cl.
CPC ......... *C08G 18/3893* (2013.01); *C08G 18/10* (2013.01); *C08G 18/222* (2013.01); *C08G 18/227* (2013.01); *C08G 18/4812* (2013.01); *C08G 18/4825* (2013.01); *C08G 18/4829* (2013.01); *C08G 18/6685* (2013.01); *C08G 18/755* (2013.01); *C08G 18/7621* (2013.01); *C09J 7/38* (2018.01); *C09J 11/08* (2013.01); *C09J 175/04* (2013.01); *C08L 75/04* (2013.01); *C09J 2203/334* (2013.01); *C09J 2301/408* (2020.08); *C09J 2467/006* (2013.01); *C09J 2475/00* (2013.01)

(58) Field of Classification Search
CPC ...... C08G 18/10; C08G 18/12; C08G 18/289; C08G 18/3893
See application file for complete search history.

(56) References Cited

U.S. PATENT DOCUMENTS

| 3,627,722 | A | * | 12/1971 | Seiter | C08G 18/10 |
| | | | | | 524/869 |
| 4,147,679 | A | * | 4/1979 | Scriven | C08G 18/0804 |
| | | | | | 204/478 |
| 4,567,228 | A | * | 1/1986 | Gaa | C08G 18/0804 |
| | | | | | 524/588 |
| 6,498,210 | B1 | * | 12/2002 | Wang | C08G 18/10 |
| | | | | | 156/329 |
| 7,365,145 | B2 | * | 4/2008 | Yang | C08G 18/10 |
| | | | | | 528/29 |
| 2002/0142169 | A1 | | 10/2002 | Hofacker et al. | |
| 2002/0146382 | A1 | * | 10/2002 | Mallo | C08G 18/10 |
| | | | | | 424/70.122 |
| 2007/0043196 | A1 | | 2/2007 | Teysseire | |
| 2007/0060714 | A1 | * | 3/2007 | Yang | C08L 71/02 |
| | | | | | 525/453 |
| 2012/0196967 | A1 | * | 8/2012 | Iwao | C08G 18/718 |
| | | | | | 524/379 |
| 2015/0259461 | A1 | | 9/2015 | Laas et al. | |

FOREIGN PATENT DOCUMENTS

| CN | 1487982 A | 4/2004 |
| CN | 1211411 C | 7/2005 |
| CN | 1829755 A | 9/2006 |
| CN | 104583260 A | 4/2015 |
| EP | 2583988 A1 | 4/2013 |
| EP | 2889348 A1 | 7/2015 |
| WO | 02/06367 A1 | 1/2002 |
| WO | 03011937 A1 | 2/2003 |
| WO | 2007037833 A2 | 4/2007 |

OTHER PUBLICATIONS

ISA/EP; International Search Report and Written Opinion for International Application No. PCT/FR2017/052162, dated Sep. 29, 2017, 11 pages.
CNIPA; Office Action for Chinese Patent Application No. 201780062187.X dated Aug. 6, 2021, 3 pages.

* cited by examiner

*Primary Examiner* — Margaret G Moore
(74) *Attorney, Agent, or Firm* — NK Patent Law

(57) ABSTRACT

The present invention provides a process for the synthesis of silylated polyurethanes, comprising three sequential steps, a step (i) of preparing NCO-terminated polyurethane, a step (ii) of partial grafting of the NCO functions with silane functions and a step (iii) of total grafting of the residual NCO functions with functions that react with the NCO functions by means of polyfunctional compounds. The present invention also provides a silylated polyurethane composition that can be obtained by means of the process according to the invention, an adhesive composition comprising said silylated polyurethane composition and a self-adhesive item obtained from the adhesive composition according to the invention.

7 Claims, No Drawings

PROCESS FOR THE SYNTHESIS OF SILYLATED POLYURETHANES AND SILYLATED POLYURETHANE COMPOSITION

CROSS-REFERENCE TO RELATED APPLICATIONS

This application is a U.S. National Stage application of International Application No. PCT/FR2017/052162, filed on Aug. 1, 2017, which claims the benefit of French Patent Application No. 1657643, filed on Aug. 8, 2016.

FIELD OF THE INVENTION

The present invention relates to a process for the synthesis of silylated polyurethanes. The present invention also relates to a composition of silylated polyurethanes comprising at least two silylated polyurethanes of different number-average molecular weight. The present invention also relates to the use of the silylated polyurethanes according to the invention in the manufacture of an adhesive composition, of a surface coating or mastic composition. The present invention also relates to a self-adhesive article comprising an adhesive layer obtained by crosslinking an adhesive composition according to the invention comprising said silylated polyurethanes.

TECHNOLOGICAL BACKGROUND

The silylated polyurethanes can be used in the formulation of self-adhesive articles of PSA type.

Pressure-sensitive adhesives (PSAs) are substances which confer, on the support layer, also known as substrate, which is coated with them, a tack at ambient temperature, which makes possible its instantaneous adhesion to a substrate under the effect of a gentle and brief pressure. PSAs are widely used in the manufacture of self-adhesive labels or films which are attached to articles for purposes of presentation of information (such as barcode, name, price) and/or for decorative purposes, whether during definitive or temporary adhesive bonding operations. PSAs are also employed in the manufacture of self-adhesive tapes of varied uses. Mention may be made, for example, besides the transparent adhesive tape widely used in daily life, of: the forming and the assembling of cardboard packagings; the protection of surfaces for painting operations; the fixing and the maintenance of various elements, such as panels, bricks, protruding objects, in the construction of buildings or edifices; the fixing and the maintenance of metal, plastic or glass parts, flat or having a specific profile, such as electric cables, plastic films, window panes, metal sheets, inscriptions, logos, parts of seats, dashboards, plastic or textile walls, conduits or pipes for the circulation of fluids, in particular in the transportation industry; the adhesive bonding of fitted carpets by double-sided adhesive tapes.

For the purpose of the manufacture of self-adhesive labels or tapes, PSAs are often applied by continuous coating processes over the whole of the surface of a large-sized support layer (if appropriate printable), in the proportion of an amount (generally expressed in g/m$^2$) denoted below by the term of "weight per unit area". The support layer consists of paper or of a polymeric material (for example in the sheet, film or plate form) having one or more layers. The adhesive layer which covers the support layer can itself be covered with a protective nonstick layer (often called release liner), for example consisting of a silicone-treated plastic film or silicone-treated paper sheet. The multilayer system obtained is generally packaged by winding in the form of large reels typically having up to 2 m in width and 1 m in diameter, which can be stored and transported.

Silylated polymers can also be used in mastic or adhesive compositions or surface coating compositions.

The document EP 2 583 988 describes a process for the preparation of a silylated polyurethane comprising the formation of a polyurethane prepolymer having NCO endings followed by the reaction of said polyurethane prepolymer having NCO endings with an aminosilane, where each of the NCO functional groups reacts with an amine functional group of the aminosilane. Such a process, in which 100% of the NCO functional groups are reacted, requires large amounts of aminosilanes, which are expensive starting materials. A more economical process for the preparation of silylated polyurethane has thus been sought.

The document WO 02/06367 discloses a process for the preparation of a silylated polyurethane or mixture of silylated polyurethanes comprising the formation of a polyurethane prepolymer having NCO endings followed by the reaction of said polyurethane prepolymer having NCO endings with an aminosilane or a mercaptosilane, where the amount of NCO functional groups can be greater than or equal to the amount of amine or thiol functional groups. In the case where the amount of NCO functional groups is greater than the amount of amine or thiol functional groups, this document discloses the possibility of adding a monol to the mixture of polymers obtained in order to neutralize the free NCO functional groups by reacting with them. The crosslinking time of the mixture of silylated polymers obtained on conclusion of the manufacturing process described in the document WO 02/06367 is high.

In point of fact, it is generally desirable for the crosslinking time, in particular of the silylated polymer or polymers, not to be too high in order to accelerate the setting time for the mastic or surface coating compositions or the time for manufacture of the self-adhesive articles for the adhesive compositions intended for the manufacture of PSAs.

The document WO 2007/037833 discloses a crosslinkable composition comprising a silylated polymer, a catalyst and at least one polyol. The polyol is used as plasticizer and is added to the composition once the latter no longer comprises free NCO functional groups. Thus, in this document WO 2007/037833, the polyol does not react with the free NCO functional groups. The viscosity of the composition described in this document is not stable over time; in particular, the viscosity has a tendency to increase over time.

Thus, the aim of the present invention is to provide a process for the manufacture of a composition of silylated polyurethanes which is more economical, said composition of polyurethanes exhibiting good performance qualities and in particular a high crosslinking rate and/or a good stability.

SUMMARY OF THE INVENTION

A first subject matter of the present invention relates to a process for the synthesis of a composition of silylated polyurethanes (A), said process comprising the sequential stages:
(i) of polyaddition of at least one polyol (B) with at least one diisocyanate (C), in which the ratio (r1) of the number of NCO functional groups to the total number of OH functional groups, and of NH and NH$_2$ functional groups optionally present, is strictly greater than 1;
(ii) of reaction of the composition obtained in stage (i) with at least one silane (E) chosen from aminosilanes (E1) and mercaptosilanes (E2), in which the ratio (r2) of the number of NCO functional groups to the number of amine and/or thiol functional groups is strictly greater than 1;
(iii) of reaction of the composition resulting from stage (ii) with at least one compound (G) comprising at least two identical or different functional groups chosen from alcohol, primary amine, secondary amine and thiol functional groups, in which the ratio (r3) of the number of NCO functional groups to the number of alcohol, primary amine, secondary amine and thiol functional groups is less than or equal to 1.

In particular, the present invention relates to a process for the synthesis of a composition of silylated polyurethanes (A), said process comprising the sequential stages:
(i) of polyaddition of at least one polyol (B) with at least one diisocyanate (C), in which the ratio (r1) of the number of NCO functional groups to the number of OH functional groups, and NH and $NH_2$ functional groups optionally present, is strictly greater than 1;
(ii) of reaction of at least one polyurethane (D) having at least two NCO functional groups obtained in stage (i) with at least one silane (E) chosen from aminosilanes (E1) and mercaptosilanes (E2), in which the ratio (r2) of the number of NCO functional groups to the number of amine and/or thiol functional groups is strictly greater than 1;
(iii) of reaction of at least one mixture of silylated polyurethanes (F) and (F') resulting from stage (ii) with at least one compound (G) comprising at least two identical or different functional groups chosen from alcohol, primary amine, secondary amine and thiol functional groups, in which the ratio (r3) of the number of NCO functional groups to the number of alcohol, primary amine, secondary amine and thiol functional groups is less than or equal to 1.

A second subject matter of the present invention relates to a composition of silylated polyurethanes (A) comprising a first type of silylated polyurethane (A1) of formula (I) and with a number-average molecular weight Mn(1) ranging from 800 to 100 000 daltons and a second type of silylated polyurethane (A2) of formula (IIa), (IIb) or (IIc) and with a number-average molecular weight Mn(2) such that the ratio Mn(2)/Mn(1) is greater than or equal to 2.0, Mn(2) preferably being less than or equal to 200 000 daltons and Mn(2) more preferably ranging from 1600 to 200 000 daltons:

Lg represents a group of type:

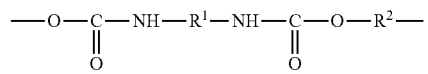

Mg represents a group of type:

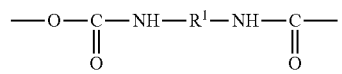

Jd represents a group of type:

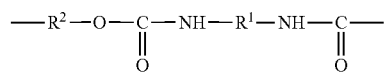

Ld represents a group of type:

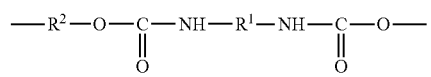

Md represents a group of type:

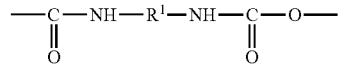

$R^1$ represents a divalent hydrocarbon radical comprising from 5 to 15 carbon atoms which can be aromatic or aliphatic and linear, branched or cyclic,
$R^3$ represents a linear or branched divalent alkylene radical comprising from 1 to 6 carbon atoms,
$R^2$ represents a divalent hydrocarbon radical optionally comprising one or more heteroatoms, preferably exhibiting a number-average molecular weight ranging from 100 g/mol to 30 000 g/mol, $$(R^5O)_{3-p}(R^4)_pSi-R^3-X-Jg-[Lg]_n-Mg-X-R^3-Si(R^4)_p(OR^5)_{3-p} \quad (I)$$

$$(R^5O)_{3-p}(R^4)_pSi-R^3-X-Jg-[Lg]_m-Mg-A-R^6-A'-Md-[Ld]_m-Jd-X-R^3-Si(R^4)_p(OR^5)_{3-p} \quad (IIa)$$

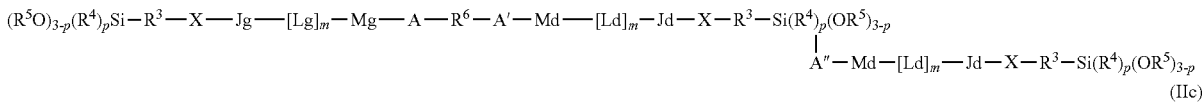
(IIb)

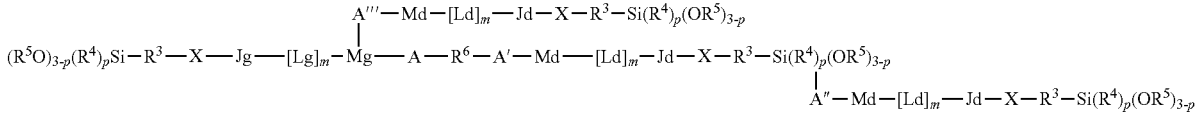
(IIc)

in which formulae:
Jg represents a group of type:

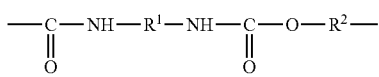

$R^4$ and $R^5$, which are identical or different, each represent a linear or branched alkyl radical comprising from 1 to 4 carbon atoms, it being possible for two $-OR^5$ groups optionally to be involved in one and the same ring, X represents a divalent radical chosen from $-NH-$, $-NR^7-$ or $-S-$, $R^7$ represents a linear, branched or cyclic alkyl radical having from 1 to 12 carbon atoms or an alkenyl radical having from 2 to 12 carbon atoms or an aryl radical having from 6 to 12 carbon atoms, $R^6$ represents a divalent, trivalent or tetravalent polysiloxane radical or a divalent, trivalent or tetravalent hydrocarbon radical optionally comprising one or more carbonyl (C=O) functional groups and optionally one or more heteroatoms, such as an oxygen atom, said $R^6$ radical preferably exhibiting a number-average molecular weight ranging from 100 g/mol to 80 000 g/mol, A, A', A'' and A''' represent, independently of one another, an oxygen atom, a sulfur atom, a divalent —NH— radical or a divalent —NR$^B$— radical; preferably, A, A', A'' and A''' each represent an oxygen atom in the formulae (IIa), (IIb) or (IIc), $R^8$ represents a linear, branched or cyclic alkyl radical comprising from 1 to 18 carbon atoms, preferably from 1 to 12 carbon atoms, more preferably from 1 to 6 carbon atoms, n is an integer greater than or equal to 1 such that the silylated polyurethane (A1) exhibits a number-average molecular weight Mn(1) as defined above, m is an integer greater than or equal to 1 such that the silylated polyurethane (A2) exhibits a number-average molecular weight Mn(2) as defined above, p is an integer equal to 0, 1 or 2.

The composition of silylated polyurethanes according to the invention can be used in various compositions, in particular adhesive compositions exhibiting especially self-adhesive properties (adhesive compositions of PSA type), such as those intended for the manufacture of self-adhesive articles, or also surface coating or mastic compositions.

Another subject matter of the present invention relates to an adhesive composition comprising at least one composition of silylated polyurethanes (A) according to the present invention and at least one additional component chosen from catalysts, fillers, tackifying resins, adhesion promoters, plasticizers or diluents, rheological agents, drying agents, UV and/or heat stabilizers (UV screening agents and antioxidants), and solvents. In particular, the present invention relates to a pressure-sensitive adhesive composition comprising at least one composition of silylated polyurethanes (A) according to the present invention, at least one tackifying resin and at least one crosslinking catalyst.

Another subject matter of the present invention relates to a self-adhesive article comprising a support layer coated with an adhesive layer, said adhesive layer being obtained by crosslinking the pressure-sensitive adhesive composition according to the invention.

The manufacturing process according to the present invention makes it possible to provide a composition of silylated polyurethanes exhibiting a high crosslinking rate.

The manufacturing process according to the invention makes it possible to provide a composition of silylated polyurethanes, the viscosity of which is stable over time.

The manufacturing process according to the invention is more economical as it requires the use of a reduced amount of expensive starting materials, such as silanes.

The composition of silylated polyurethanes according to the invention does not comprise residual free diisocyanate monomers, so that the products comprising said composition of silylated polyurethanes do not form the subject of a regulatory labelling due to the presence of residual diisocyanate monomers regarded as potentially toxic.

DETAILED DESCRIPTION OF THE EMBODIMENTS OF THE INVENTION

In the present patent application, unless otherwise indicated:

the viscosity is measured at 23° C. using a Brookfield RVT viscometer, with a rotational speed of 20 revolutions/minute and a 7 spindle.

the number-average molecular weight of the polyurethanes, of the compositions of polyurethanes or of the tackifying resins (generally expressed in daltons) can be determined by methods well known to a person skilled in the art, for example by size exclusion chromatography (GPC), for example using a polystyrene standard.

Process for the Synthesis of the Compositions of Silylated Polyurethanes

The process of synthesis according to the invention comprises the sequential stages:

(i) of polyaddition of at least one polyol (B) with at least one diisocyanate (C), in which the ratio (r1) of the number of NCO functional groups to the total number of OH functional groups with the addition of the NH and NH$_2$ functional groups optionally present, is strictly greater than 1, so as to form a composition comprising at least one polyurethane (D) having at least two NCO functional groups;

(ii) of reaction of the composition obtained in stage (i) with at least one silane (E) chosen from aminosilanes (E1), mercaptosilanes (E2) and their mixture, in which the ratio (r2) of the number of NCO functional groups to the number of amine and thiol functional groups is strictly greater than 1, so as to form a composition comprising at least one polyurethane (F) having at least one silyl functional group and at least one NCO functional group and at least one polyurethane (F') having at least two silyl functional groups and devoid of NCO functional groups, and optionally at least one polyurethane (D) having at least two NCO functional groups;

(iii) of reaction of the composition obtained on conclusion of stage (ii) with at least one compound (G) exhibiting at least two functional groups chosen from alcohol, primary amine, secondary amine and thiol functional groups, in which the ratio (r3) of the number of NCO functional groups to the number of alcohol, primary amine, secondary amine and thiol functional groups is less than or equal to 1, so as to obtain a composition of silylated polyurethanes.

In the first stage of the synthesis process (i), at least one polyol (B), optionally as a mixture with at least one difunctional chain extender, is reacted with at least one diisocyanate (C), in which the ratio (r1) of the number of NCO functional groups to the number of OH functional groups (and NH and NH$_2$ functional groups optionally present) is strictly greater than 1, so as to form a polyurethane (D) having at least two NCO functional groups, it being possible for the amine functional groups of NH and NH$_2$ type to originate from the chain extender(s) optionally present in the polyol (B) composition.

Thus, as it is possible for the polyol (B) to be employed in stage (i) in the form of a composition comprising at least one polyol (B) and at least one difunctional chain extender, the ratio (r1) can be written in the following way: NCO/(OH+NH+NH$_2$), it being possible for the amine functional groups of NH and NH$_2$ type to originate from chain extender(s) optionally present in the polyol (B) composition. In the absence of such chain extender(s), the ratio (r1) can be written NCO/OH.

Difunctional chain extender is understood to mean a chain extender having two functional groups chosen, independently of one another, for example from hydroxyl, primary amine or secondary amine functional groups, each of the functional groups being capable of reacting with an NCO group of a diisocyanate.

When the polyol (B) is employed in the form of a composition additionally comprising at least one difunctional chain extender, the latter is preferably chosen from diols and polyamines with a molecular weight of between 60 and 500 g/mol.

Mention will be made, by way of illustration of such diols (chain extender), of ethylene glycol, propylene glycol, diethylene glycol, dipropylene glycol, 3-methyl-1,5-propanediol, 1,4-butanediol, 1,6-hexanediol, 2-ethyl-1,3-hexanediol, N,N-bis(2-hydroxypropyl)aniline or 3-methyl-1,5-pentanediol.

Mention will be made, by way of illustration of such polyamines (chain extender), of ethylenediamine, diphenylmethanediamine, isophoronediamine, hexamethylenediamine, diethyltoluenediamine and polyetheramines.

The chain extender is different from the compounds (G) defined in the present patent application.

The polyol (B) can be employed in stage (i), alone or in the form of a polyol (B) composition as defined above.

The polyol (B) employed in stage (i) can be aliphatic or aromatic. In particular, the polyol (B) can be chosen from polyether polyols, polyester polyols, polytetrahydrofurans and polyacrylate polyols. Preferably, the molecular weight of the polyol or polyols (B) ranges from 100 to 30 000 g/mol or from 250 to 12 000 g/mol or also from 400 to 8000 g/mol, and their hydroxyl functionality preferably ranges from 2 to 4, more preferably from 2 to 3. The hydroxyl functionality is the mean number of hydroxyl functional groups per mole of polyol. The molecular weight shown is a number-average molecular weight (generally denoted Mn) which can be determined, for example, from the hydroxyl number (OHN) and the functionality of the polyol.

Mention may be made, by way of examples of aliphatic polyether polyols, of the oxyalkylated derivatives (such as ethylene, propylene or butylene oxides) of:

diols (such as ethylene glycol, propylene glycol, neopentyl glycol), of triols (such as glycerol, trimethylolpropane and hexane-1,2,6-triol), or of tetrols (such as pentaerythritol).

These products are widely available commercially.

According to a preferred alternative form, the polyol (B) is a polyether diol or a mixture of polyether diols, and in particular a polypropylene glycol.

According to an alternative embodiment, the polyol (B) is chosen from polypropylene glycols (or PPGs) with a hydroxyl functionality equal to 2 and with a molecular weight of approximately 4000 g/mol. Mention may be made, by way of example of such a polyol (B), of Voranol® EP1900 available from Dow Chemical.

According to one embodiment, the polyol (B) which is reacted during stage (i) corresponds to the formula (III):

HO—R²—OH        (III)

in which: R² represents a divalent hydrocarbon radical optionally comprising one or more carbonyl (C=O) functional groups and optionally one or more heteroatoms, such as an oxygen atom, said polyol (B) preferably exhibiting a number-average molecular weight ranging from 100 g/mol to 30 000 g/mol, more particularly from 250 g/mol to 12 000 g/mol or also from 400 g/mol to 8000 g/mol.

The heteroatom or heteroatoms can be present in the main hydrocarbon chain or else in branchings of the main hydrocarbon chain.

By way of example, in the case where the polyol (B) is a polypropylene glycol, R² can represent the following divalent radical: —[CH(CH₃)—CH₂—O-]$_q$CH₂—CH(CH₃)— 

where q represents an integer which varies according to the number-average molecular weight of the polypropylene glycol.

According to one embodiment, the diisocyanate (C) which is reacted during stage (i) corresponds to the formula (IV):

OCN—R¹—NCO        (IV)

in which: R¹ represents a divalent hydrocarbon radical comprising from 5 to 15 carbon atoms which can be aromatic or aliphatic and linear, branched or cyclic.

Preferably, R¹ is chosen from one of the following divalent radicals, the formulae of which below show the 2 free valencies:

a) the divalent radical derived from isophorone:

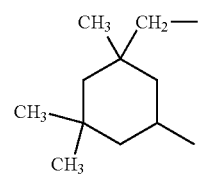

b) the radical derived from 4,4'-HMDI:

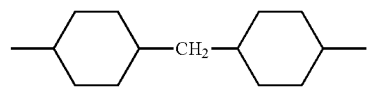

c) the divalent radical derived from 2,4-TDI or 2,6-TDI:

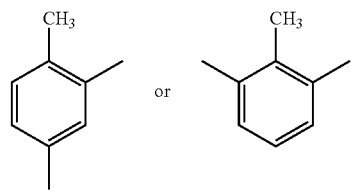

d) the divalent radical derived from 2,4'-MDI or 4,4'-MDI:

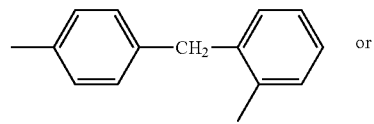
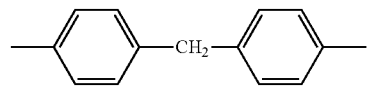

e) the divalent radical —(CH₂)₆— (or hexamethylene radical), which is derived from hexamethylene diisocyanate (HDI), f) the divalent radical derived from xylylene diisocyanate (such as m-XDI):

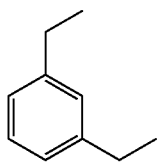

Such diisocyanates are commonly available commercially.

A diisocyanate (C) of formula (IV) in which IV is an aromatic radical can preferably be used, and the diisocyanate of formula (IV) in which IV is the divalent radical c) derived from toluene diisocyanate (TDI) is particularly advantageous.

In the present stage (i) of the process according to the invention, the polyol(s) (B) are reacted with an excess, in terms of equivalent functional group, of the diisocyanate(s) (C), in order to obtain a ratio (r1) of strictly greater than 1. This means that the amounts of the 2 reactants employed in stage (i) correspond to an excess of the total equivalent number of —NCO groups (present in the amount of isocyanate), with respect to the total equivalent number of —OH groups (present in the amount of polyol(s) (B)), increased, if appropriate, by the equivalent number of the —OH, —NH$_2$ and/or —NH— groups present in the abovementioned difunctional chain extender(s).

Preferably, these amounts correspond to an NCO/OH or NCO/(OH+NH+NH$_2$) equivalent ratio ranging from 1.1 to 4, preferably from 1.5 to 3, preferentially from 1.5 to 2.5, advantageously from 1.7 to 2, for example 1.9.

Said ratio is defined as being equal to the total equivalent number of —NCO functional groups divided by the total equivalent number of —OH, —NH$_2$ and/or —NH-functional groups, as regards the functional groups carried by the corresponding amounts of the two reactants, namely the diisocyanate(s), on the one hand, and, on the other hand, the composition consisting of at least one polyol (B) and, if appropriate, at least one difunctional chain extender. The amounts by weight of the reactants to be charged to the reactor are determined on the basis of this ratio, and also, as regards the polyol(s), on (their) its hydroxyl number (OHN) and, as regards the diamine(s) optionally present, on the basis of its (their) total alkalinity. The hydroxyl number (OHN) is the number of hydroxyl functional groups per gram of polyol determined by chemical assaying, said number being expressed, in particular in the present text, in the form of the equivalent number of milligrams of KOH per gram of polyol which are used in said assaying. The total alkalinity is the number of primary and/or secondary amine functional groups per gram of polyamine determined by potentiometric titration, said value being expressed, in particular in the present text, in the form of milliequivalents of HCl per gram of polyamine which are used in said titration.

The number of NCO functional groups, the number of OH functional groups and also the number of —NH$_2$ and/or —NH— functional groups are data well known and accessible to a person skilled in the art.

The catalyst optionally used in stage (i) can be any catalyst known for accelerating the rate of reaction of a polyisocyanate with a polyol. Such a catalyst will be denoted by reaction catalyst.

When the diisocyanate (C) of formula (IV) is such that R$^1$ is an aliphatic radical, stage (i) is preferably carried out in the presence of a reaction catalyst chosen, for example, from organometallic salts, such as organometallic salts or complexes of lead, cobalt, iron, nickel, titanium, bismuth, zinc and tin, such as, for example, dibutyltin dilaureate (or DBTL), titanium tetraisopropoxide or bismuth/zinc carboxylates.

The polyaddition reaction of stage (i) is preferably carried out at a temperature ranging from 50° C. to 100° C.

The composition obtained on conclusion of the polyaddition reaction of stage (i) no longer comprises entities carrying —OH, —NH$_2$ or —NH— functional groups.

Preferably, the polyaddition reaction of stage (i) makes it possible to obtain a percentage by weight of NCO functional groups ranging from 0.5% to 3% by weeks, preferably ranging from 1% to 2.5% by weight, preferentially from 1% to 2%, advantageously from 1.5% to 2%, with respect to the total weight of the composition obtained on conclusion of stage (i). The progress of the polyaddition reaction of stage (i) can be monitored by potentiometric titration according to methods well known to a person skilled in the art.

The composition obtained on conclusion of stage (i) (also denoted by product of stage (i) or product resulting from the reaction of stage (i)) comprises at least one polyurethane (D) having at least two NCO functional groups and preferably exhibiting a number-average molecular weight ranging from 450 daltons to 100 000 daltons.

During stage (ii), a silane (E) is added to the composition resulting from stage (i) comprising at least one polyurethane (D) exhibiting at least two NCO functional groups.

The silane (E) used in stage (ii) is chosen from aminosilanes (E1) and mercaptosilanes (E2). The aminosilanes (E1) can be primary aminosilanes, i.e. aminosilanes comprising at least one primary amine (—NH$_2$) functional group, or secondary aminosilanes, i.e. aminosilanes comprising at least one secondary amine (—NH—) functional group. The mercaptosilanes (E2) preferably exhibit at least one —SH functional group.

Preferably, the silane (E) comprises an alkoxysilane group, such as a group of —Si(R$^4$)$_p$(OR$^5$)$_{3-p}$ type where R$^4$ and R$^5$, which are identical or different, each represent a linear or branched alkyl radical comprising from 1 to 4 carbon atoms, it being possible for two —OR$^5$ groups optionally to be involved in one and the same ring, and where p represents an integer equal to 0, 1 or 2, preferably p being equal to 0 or 1.

Thus, during stage (ii), the ratio (r2) of the number of NCO functional groups to the number of —NH$_2$, —NH— and/or —SH functional groups is strictly greater than 1; preferably, said ratio (r2) ranges from 1.1 to 5, in particular from 1.1 to 2.5, preferably from 1.1 to 2, advantageously from 1.1 to 1.5, for example from 1.3 to 1.5. According to a preferred embodiment, the ratio (r2) is strictly greater than 1.1, in particular strictly greater than 1.1 and less than 5; preferably, (r2) is strictly greater than 1.2 and less than 5; for example, (r2) ranges from 1.3 to 5, advantageously from 1.3 to 2.5.

According to a specific embodiment, when the compound (G) used in stage (iii) is difunctional (i.e., comprises solely two functional groups chosen from alcohol, primary amine, secondary amine and thiol functional groups), then the ratio (r2) preferably ranges from 1.1 to 5, in particular from 1.1 to 2.5, preferentially from 1.1 to 2, advantageously from 1.1 to 1.5, for example from 1.3 to 1.5; and, when the compound (G) used in stage (iii) is trifunctional (i.e., comprises solely three functional groups chosen from alcohol, primary amine, secondary amine and thiol functional groups) or comprises more than three functional groups chosen from alcohol, primary amine, secondary amine and thiol functional groups, then the ratio (r2) preferably ranges from 1.1 to 2.5, preferentially from 1.3 to 2.5.

For a given composition, the number of —NH$_2$, —NH and/or —SH functional groups is well known and accessible to a person skilled in the art.

According to one embodiment, the silane (E) corresponds to the formula (VI):

$$X'\text{—}R^3\text{—}Si(R^4)_p(OR^5)_{3-p} \quad (VI)$$

in which:
X' represents an NH$_2$, NHR$^7$ and/or SH group,
R$^7$ represents a linear, branched or cyclic alkyl radical having from 1 to 12 carbon atoms or an alkenyl radical having from 2 to 12 carbon atoms or an aryl radical having from 6 to 12 carbon atoms,
R$^3$ represents a linear or branched divalent alkylene radical comprising from 1 to 6 carbon atoms,
R$^4$ and R$^5$, which are identical or different, each represent a linear or branched alkyl radical comprising from 1 to 4 carbon atoms, it being possible for two —OR$^5$ groups optionally to be involved in one and the same ring,
p represents an integer equal to 0, 1 or 2; preferably, p represents 0 or 1.

Thus, when X' represents NH$_2$ or NHR$^7$, then the silane (E) is an aminosilane (E1) and, when X' represents SH, then the silane (E) is a mercaptosilane (E2).

Preferably, the silane (E) is an aminosilane (E1) and more preferably a secondary aminosilane, that is to say an aminosilane having a secondary amine functional group.

Mention may be made, by way of examples of silane compounds (E) which can be used during stage (ii), of the following compounds:
the aminosilane of formula: H$_2$N—(CH$_2$)$_3$—Si(OCH$_3$)$_3$ available from Momentive under the name Silquest® A1110;
the aminosilane of formula: nBu-NH—(CH$_2$)$_3$—Si(OCH$_3$)$_3$
available from Evonik under the name Dynasylan® 1189;
the aminosilane of formula: CH$_3$—CH$_2$—NH—CH$_2$—CH(CH$_3$)—CH$_2$—Si(OCH$_3$)$_3$
available from Momentive under the name Silquest® A-link 15;
the aminosilane of formula: C$_6$H$_{11}$—NH—(CH$_2$)$_3$—Si(OCH$_3$)$_3$ where the C$_6$H$_{11}$ group represents a cyclohexyl group
available from Wacker under the name Geniosil® GF92.

The product of stage (i) can comprise, besides the polyurethane (D) having NCO endings, a residual amount of unreacted diisocyanate monomer (C), for example ranging up to 1% by weight of the weight of said product.

During stage (ii), the silane (E) is introduced in an amount such that the amount of —NH$_2$, —NH— and —SH functional groups is less than the amount of NCO functional groups in the product of stage (i). The amount of NCO functional groups in the product of stage (i) can originate from the polyurethane (D) comprising at least two NCO functional groups but also from the unreacted diisocyanate (C).

As the ratio (r2) is strictly greater than 1, the composition obtained on conclusion of stage (ii) (also denoted by product of stage (ii) or product resulting from the reaction of stage (ii)) comprises a mixture of silylated polyurethanes, said mixture comprising at least one polyurethane (F) having at least one silyl functional group and at least one NCO functional group and at least one polyurethane (F) having at least two silyl functional groups and devoid of NCO functional groups. The polyurethane (F) corresponds to an NCO-terminated polyurethane (D) resulting from stage (i), all the NCO functional groups of which have reacted with the silane (E) introduced.

The product of stage (ii) can additionally comprise:
residual amounts of unreacted diisocyanate monomer (C) (generally present in a minor amount by weight) and
NCO-terminated polyurethanes (D), that is to say polyurethanes resulting from stage (i), no NCO functional group of which has reacted with the silane (E).

The polyurethane (F) having at least one silyl functional group and at least one NCO functional group preferably exhibits a number-average molecular weight ranging from 600 daltons to 100 000 daltons.

The reaction of stage (ii) is preferably carried out at a temperature ranging from 50° C. to 100° C.

Stage (iii) consists in reacting the composition obtained on conclusion of stage (ii) with a compound (G) comprising at least two functional groups chosen from alcohol, primary amine, secondary amine and thiol functional groups.

The compound (G) is preferably liquid at ambient temperature (approximately 23° C.).

The amount of compound (G) added to the composition resulting from stage (ii) is such that the ratio (r3) of the number of NCO functional groups to the number of alcohol, primary amine, secondary amine and thiol functional groups is less than or equal to 1. Preferably, this ratio (r3) is additionally greater than or equal to 0.6. More preferably, this ratio (r3) ranges from 0.7 to 1, more preferably still from 0.8 to 1 and better still from 0.9 to 1. A ratio (r3) of greater than 0.6, in particular a ratio (r3) which approaches 1, advantageously makes it possible to improve the stability of the viscosity of the product resulting from stage (iii).

Thus, the composition resulting from stage (iii) no longer comprises free NCO functional groups; this is because all the NCO functional groups, originating either from the unreacted diisocyanate monomer (C) or from a polyurethane comprising at least one NCO functional group, have reacted with the alcohol, amine and/or thiol functional groups of the compound (G).

The compound (G) comprises at least two identical or different, preferably identical, functional groups chosen from alcohol (OH), primary amine (—NH$_2$), secondary amine (—NH—) and thiol (—SH) functional groups. According to one embodiment, the compound (G) comprises at least three identical or different, preferably identical, functional groups chosen from alcohol, primary amine, secondary amine and thiol functional groups. More preferably, the compound (G) is chosen from polyols and polyamines having at least two or at least three amine functional groups chosen from primary amine functional groups and secondary amine functional groups.

In the case where the compound (G) comprises at least one secondary amine (—NH—) functional group, the secondary amine functional group may exhibit the formula —NHR$^8$ where R$^8$ represents a linear, branched or cyclic alkyl radical comprising from 1 to 18 carbon atoms, preferably from 1 to 12 carbon atoms, more preferably from 1 to 6 carbon atoms.

Thus, the ratio (r3) take into account all of the functional groups capable of reacting with the NCO functional groups. This ratio (r3) can thus be formulated in the following way:

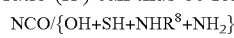

NCO/{OH+SH+NHR$^8$+NH$_2$} where: OH represents the number of alcohol functional groups, determined from the hydroxyl number (OHN), expressed in meq/g,
SH represents the number of thiol functional groups, determined from the thiol number (SHN), expressed in meq/g,
NHR$^8$ represents the number of secondary amine functional groups, determined from the total alkalinity, expressed in meq/g,
NH$_2$ represents the number of primary amine functional groups, determined from the total alkalinity, expressed in meq/g.

When the compound (G) used during stage (iii) is a polyol, the latter can be identical to or different from the polyol (B) used during stage (i). In particular, it can preferably be chosen from polyether polyols, polyester polyols, polycarbonate polyols, polyisoprene polyols, polyacrylate polyols, polysiloxane polyols and polybutadiene polyols, alone or else their mixtures.

When the compound (G) is chosen from polyamines as defined above, this compound can preferably be chosen from the corresponding polyether polyamines and polysiloxane polyamines, alone or else their mixtures.

The compound (G) preferably exhibits a number-average molecular weight ranging from 100 g/mol to 80 000 g/mol, or from 250 g/mol to 50 000 g/mol, or from 400 to 25 000 g/mol, or from 600 to 20 000 g/mol, or also from 1100 to 12 000 g/mol, indeed even from 1500 to 10 000 g/mol.

According to one embodiment, the compound (G) can be is difunctional, trifunctional or tetrafunctional. In this case, the compound (G) can exhibit the formula (VIIIa), (VIIIb) or (VIIIc):

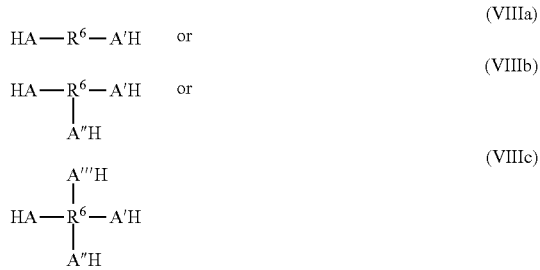

in which:

A, A', A" and A'" represent, independently of one another, an oxygen atom, a sulfur atom, a divalent —NH— radical or a divalent —NR$^8$— radical; preferably, A and A' are identical in the formula (VIIIa), A, A' and A" are identical in the formula (VIIIb) and A, A', A" and A'" are identical in the formula (VIIIc), $R^8$ represents a linear, branched or cyclic alkyl radical comprising from 1 to 18 carbon atoms, preferably from 1 to 12 carbon atoms, more preferably from 1 to 6 carbon atoms, $R^6$ represents a polysiloxane radical or a hydrocarbon radical optionally comprising one or more carbonyl (C=O) functional groups and optionally one or more heteroatoms, such as one or more oxygen atoms. Preferably, $R^6$ exhibits a number-average molecular weight ranging from 100 g/mol to 80 000 g/mol, preferably from 250 g/mol to 50 000 g/mol, more preferably from 400 to 25 000 g/mol, indeed even from 600 to 20 000 g/mol or from 1100 to 12 000 g/mol or also from 1500 to 10 000 g/mol. Thus, in the formula (VIIIa), $R^6$ is a divalent radical, in the formula (VIIIb), $R^6$ is a trivalent radical and, in the formula (VIIIc), $R^6$ is a tetravalent radical.

Preferably, the compound (G) is chosen from diols, triols, tetrols, primary diamines (preferably comprising two —NH$_2$ functional groups), primary triamines (preferably comprising three —NH$_2$ functional groups), secondary diamines (preferably comprising two —NH— functional groups), secondary triamines (i.e., comprising three —NH— functional groups), dithiols and trithiols. More preferably, the compound (G) is chosen from diols and triols, and better still from diols.

The diols and triols (G) preferably exhibit a number-average molecular weight ranging from 100 g/mol to 80 000 g/mol, preferably from 250 g/mol to 50 000 g/mol, preferably from 400 to 25 000 g/mol, more preferably from 600 to 20 000 g/mol, indeed even from 1100 to 12 000 g/mol or also from 1500 to 10 000 g/mol.

According to one embodiment, the compound (G) is a diol corresponding to the formula (IX):

$$HO-R^6-OH \qquad (IX)$$

where: $R^6$ represents a divalent radical chosen from polysiloxane radicals and hydrocarbon radicals optionally comprising one or more carbonyl (C=O) functional groups and optionally one or more heteroatoms, such as, preferably, one or more oxygen atoms. Preferably, $R^6$ is such that the compound (G) exhibits a number-average molecular weight ranging from 100 to 80 000 g/mol, preferably from 250 to 50 000 g/mol, more preferably from 400 to 25 000 g/mol, indeed even from 600 to 20 000 g/mol or from 1100 to 12 000 g/mol or also from 1500 to 10 000 g/mol.

The heteroatom or heteroatoms and carbonyl functional groups mentioned in the formulae defined above can be present in the main hydrocarbon chain or else in branchings of the main hydrocarbon chain.

In the case where the diol (G) is a polypropylene glycol, $R^6$ can represent the following divalent radical: —[CH(CH$_3$)—CH$_2$—O-]$_q$CH$_2$—CH(CH$_3$)— where: q represents an integer which varies according to the number-average molecular weight of said polypropylene glycol.

The compound (G) can be used alone or in the form of a mixture of several compounds (G) chosen from those defined above.

Preferably, the composition of silylated polyurethanes obtained on conclusion of stage (iii) comprises at least two silylated polyurethanes of different number-average molecular weight, including a first silylated polyurethane with a number-average molecular weight Mn'$_1$ ranging from 800 daltons to 100 000 daltons and a second silylated polyurethane with a number-average molecular weight Mn'$_2$ such that the ratio Mn'$_2$/Mn'$_1$ is greater than or equal to 2.0, Mn'$_2$ preferably being less than or equal to 200 000 daltons and Mn'$_2$ more preferably ranging from 1600 to 200 000 daltons.

In general, when the compound (G) is chosen from difunctional compounds, preferably from diols, the ratio Mn'$_2$/Mn'$_1$ is greater than or equal to 2.0.

In general, when the compound (G) is chosen from trifunctional compounds, preferably from triols, the ratio Mn'$_2$/Mn'$_1$ is greater than or equal to 3.0.

According to one embodiment, the composition resulting from stage (iii) exhibits a viscosity at 23° C. ranging from 20 000 to 2 000 000 mPa·s, said viscosity preferably being measured one day after manufacture of said composition.

The reaction of stage (iii) is preferably carried out at a temperature ranging from 50° C. to 100° C.

The end of the reaction of stage (iii) can be monitored by infrared analysis by detecting the disappearance of the band corresponding to the NCO functional groups (2300 cm$^{-1}$).

The process according to the invention can additionally comprise a stage of introduction of one or more of the following additional compounds: a plasticizer or diluent, a humidity absorber, a UV stabilizng agent and/or an antioxidant.

The addition of this (these) additional compound(s) can take place before, after or during any one of stages (i), (ii) or (iii) of the preparation process according to the invention. In particular, the addition of this (these) additional compound(s) takes place at the end of the synthesis of the composition of silylated polyurethanes.

According to one embodiment, the diisocyanate (C) corresponds to the formula (IV) and the polyol (B) corresponds to the formula (III) as are defined above. According to this embodiment, the product resulting from the reaction of stage (i) comprises at least one polyurethane (D) corresponding to the formula (V):

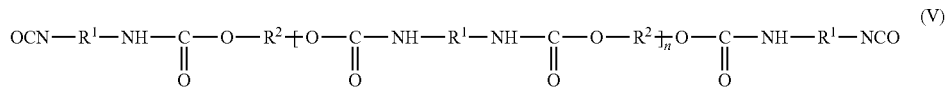

(V)

where: $R^1$ and $R^2$ have the same meanings as above and n is an integer greater than or equal to 1 such that the polyurethane (D) exhibits a number-average molecular weight ranging from 450 to 100 000 daltons.

According to one embodiment, a silane (E) corresponding to the formula (VI) as defined above is added to the composition resulting from stage (i) comprising the polyurethane (D) of formula (V) defined above. According to this embodiment, the composition resulting from the reaction of stage (ii) can comprise:

a monosilylated polyurethane (F) comprising an alkoxysilyl functional group and an NCO functional group and corresponding to the formula (VII):

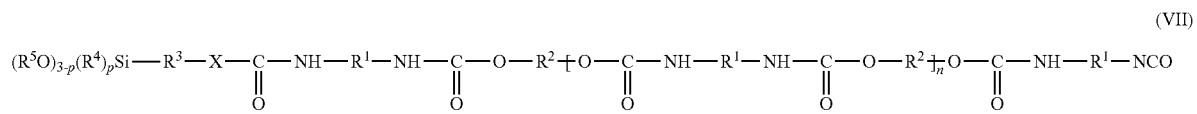

(VII)

and a disilylated polyurethane (F) devoid of NCO functional groups, i.e.

comprising two alkoxysilyl functional groups, and corresponding to the formula (VII'):

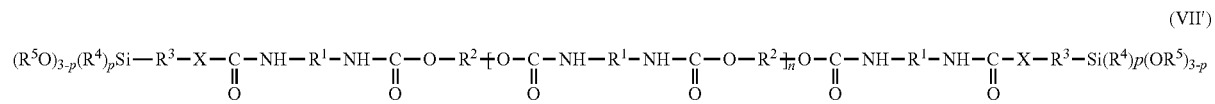

(VII')

in which formulae: $R^1$ originates from the diisocyanate (C), $R^2$ originates from the polyol (B) and X originates from the silane (E), X being a divalent radical corresponding to the X' group of the formula (VI) defined above having lost a hydrogen atom from the amine or thiol functional group, and $R^3$, $R^4$, $R^5$, p and n are as defined above.

The composition resulting from stage (ii) can optionally additionally comprise the polyurethane (D) of formula (V) which would not have reacted, in particular if the ratio (r2) is high, for example if the ratio (r2) ranges from 2.5 to 5.

According to one embodiment, a difunctional, trifunctional or tetrafunctional compound (G) corresponding to one of the formulae (VIIIa), (VIIIb) or (VIIIc) as are defined above is added to the composition resulting from stage (ii) comprising the polyurethanes of formulae (VII) and (VII') (and optionally of formula (V)). According to this embodiment, the composition resulting from stage (iii) can comprise:

a disilylated polyurethane (A1) devoid of NCO functional group, i.e. comprising two alkoxysilyl functional groups, and corresponding to the formula (I) (the polymer of formula (I) being identical to the polymer (F) of formula (VII') defined above):

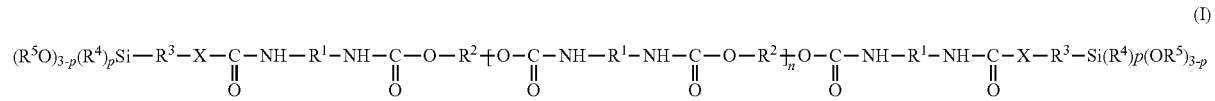

(I)

which can also be represented by the following "schematic" formula:

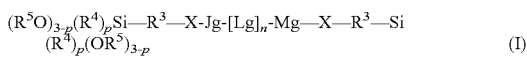     (I)

and a polysilylated polyurethane (A2) devoid of NCO functional groups and corresponding to the formula (IIa), (IIb) or (IIc):

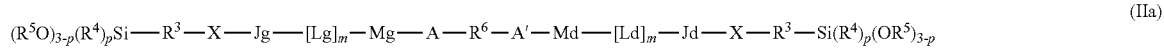 (IIa)

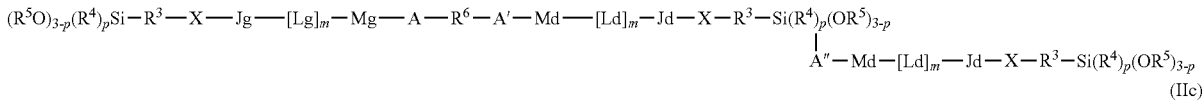 (IIb)

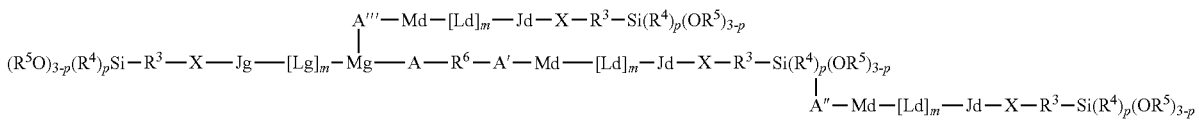 (IIc)

in which:
Jg represents a group of type:

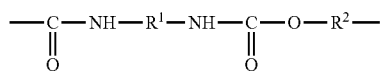

Lg represents a group of type:

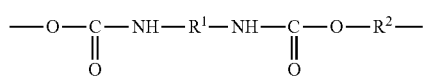

Mg represents a group of type:

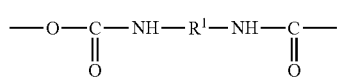

Jd represents a group of type:

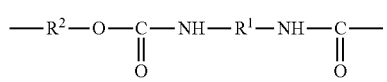

Ld represents a group of type:

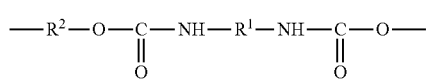

Md represents a group of type:

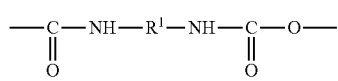

$R^1$ represents a divalent hydrocarbon radical comprising from 5 to 15 carbon atoms which can be aromatic or aliphatic and linear, branched or cyclic, $R^3$ represents a linear or branched divalent alkylene radical comprising from 1 to 6 carbon atoms, $R^2$ represents a divalent hydrocarbon radical optionally comprising one or more heteroatoms, preferably exhibiting a number-average molecular weight ranging from 100 g/mol to 30 000 g/mol, $R^4$ and $R^5$, which are identical or different, each represent a linear or branched alkyl radical comprising from 1 to 4 carbon atoms, it being possible for two —$OR^5$ groups optionally to be involved in one and the same ring, X represents a divalent radical chosen from —NH—, —$NR^7$— or —S—, $R^7$ represents a linear, branched or cyclic alkyl radical having from 1 to 12 carbon atoms or an alkenyl radical having from 2 to 12 carbon atoms or an aryl radical having from 6 to 12 carbon atoms, $R^6$ represents a divalent radical (formula (IIa)), a trivalent radical (formula (IIb)) or a tetravalent radical (formula (IIc)) chosen from polysiloxane radicals and from hydrocarbon radicals optionally comprising one or more carbonyl (C=O) functional groups and optionally one or more heteroatoms, preferably exhibiting a number-average molecular weight ranging from 100 g/mol to 80 000 g/mol, A, A', A" and A''' represent, independently of one another, an oxygen atom, a sulfur atom, a divalent —NH— radical or a divalent —$NR^8$— radical; preferably, A, A', A" and A''' each represent an oxygen atom in the formulae (IIa), (IIb) or (IIc), $R^8$ represents a linear, branched or cyclic alkyl radical comprising from 1 to 18 carbon atoms, preferably from 1 to 12 carbon atoms, more preferably from 1 to 6 carbon atoms, n is an integer greater than or equal to 1 such that the polyurethane (A1) exhibits a number-average molecular weight Mn(1) ranging from 800 to 100 000 daltons, m is an integer greater than or equal to 1 such that the polyurethane (A2) exhibits a number-average molecular weight Mn(2) such that the ratio Mn(2)/Mn(1) is greater than or equal to 2.0, p is an integer equal to 0, 1 or 2; preferably, p represents 0 or 1.

Of course, when a polymer comprises several $R^i$ groups (i ranging from 1 to 7), each $R^i$ can be identical or different.

Preferably, the disilylated polyurethane (A1) devoid of NCO functional groups and corresponding to the formula (I) obtained on conclusion of stage (iii) exhibits a number-average molecular weight Mn(1) ranging from 800 to 100 000 daltons, preferably ranging from 1500 to 80 000 daltons, more preferably ranging from 2500 to 50 000 daltons.

According to one embodiment, the number-average molecular weight Mn(2) ranges from 1600 daltons to 200 000 daltons, preferably from 3000 daltons to 160 000 daltons, more preferably from 5000 to 100 000 daltons.

In particular, when the polymer (A2) devoid of NCO functional groups corresponds to the formula (IIa) obtained on conclusion of stage (iii), it exhibits a number-average molecular weight Mn(2) such that the ratio Mn(2)/Mn(1) is greater than or equal to 2.0.

In particular, when the polymer (A2) devoid of NCO functional groups corresponds to the formula (IIb) or (IIc) obtained on conclusion of stage (iii), it exhibits a number-average molecular weight Mn(2) such that the ratio Mn(2)/Mn(1) is greater than or equal to 3.0.

Preferably, the composition obtained on conclusion of stage (iii) exhibits a viscosity at 23° C. ranging from 20 000 to 2 000 000 mPa·s, said viscosity preferably being measured one day after the preparation of said composition.

The composition of silylated polyurethanes obtained on conclusion of the process according to the invention exhibits specific properties, in particular by virtue of silylated polyurethanes exhibiting a particular number-average molecular weight distribution, which makes it possible advantageously to obtain high rates of crosslinking and/or a good stability, in particular a good stability of the viscosity.

Composition of Silylated Polyurethanes

A subject matter of the present invention is also a composition of silylated polyurethanes (A) comprising a first type of silylated polyurethane (A1) of formula (I) as defined above and with a number-average molecular weight Mn(1) ranging from 800 to 100 000 daltons and a second type of silylated polyurethane (A2) of formula (IIa), (IIb) or (IIc) as defined above and with a number-average molecular weight Mn(2) such that the ratio Mn(2)/Mn(1) is greater than or equal to 2.0, Mn(2) preferably being less than or equal to 200 000 daltons and Mn(2) more preferably ranging from 1600 to 200 000 daltons.

According to one embodiment, the number-average molecular weight Mn(1) ranges from 1500 to 80 000 daltons, preferably from 2500 to 50 000 daltons.

According to one embodiment, the number-average molecular weight Mn(2) preferably ranges from 3000 to 160 000 daltons, more preferably from 5000 to 100 000 daltons.

In particular, when the silylated polymer (A2) devoid of NCO functional groups corresponds to the formula (IIa) obtained on conclusion of stage (iii), it exhibits a number-average molecular weight Mn(2) such that the ratio Mn(2)/Mn(1) is greater than or equal to 2.0.

In particular, when the silylated polymer (A2) devoid of NCO functional groups corresponds to the formula (IIb) or (IIc) obtained on conclusion of stage (iii), it exhibits a number-average molecular weight Mn(2) such that the ratio Mn(2)/Mn(1) is greater than or equal to 3.0.

Preferably, the composition of silylated polyurethanes exhibits a viscosity at 23° C. ranging from 20 000 to 2 000 000 mPa·s, said viscosity preferably being measured one day after the preparation of said composition.

The composition of silylated polyurethanes according to the invention is capable of being obtained by the process according to the invention.

The composition of silylated polyurethanes according to the invention can be obtained by the process according to the invention, in particular according to the stages described above, by reacting a diisocyanate (C) of formula OCN—$R^1$—NCO and a polyol (B) of formula HO—$R^2$—OH during stage (i), by then introducing a silane (E) of formula X'—$R^3$—$Si(R^4)_p(OR^5)_{3-p}$ during stage (ii), followed by the addition, during stage (iii), of a compound (G) of formulae (VIIIa), (VIIIb) or (VIIIc) as are defined above.

Use of the Composition of Silylated Polyurethanes According to the Invention

The composition of silylated polyurethanes according to the invention can be used in various compositions, in particular in adhesive compositions exhibiting especially self-adhesive properties (self-adhesive compositions or adhesive compositions of PSA type), such as those intended for the manufacture of self-adhesive articles, or also in surface coating or mastic compositions.

Thus, another subject matter of the present invention relates to a composition (denoted composition (P)) comprising the composition of silylated polyurethanes according to the invention and at least one additional component chosen from catalysts, fillers, tackifying resins, adhesion promoters, plasticizers, rheological agents, drying agents, UV and/or heat stabilizers (UV screening agents and antioxidants), and solvents. Preferably, the composition (P) comprises at least one additional component chosen from catalysts, fillers and tackifying resins.

The additional component or components are chosen according to the use of the composition (P).

In particular, when the composition (P) is intended to be used as self-adhesive composition, it preferably comprises at least one additional component chosen from catalysts, fillers and tackifying resins.

The composition of silylated polyurethanes can represent from 5% to 85% by weight of the adhesive composition, preferably from 10% to 70% by weight, more preferably from 15% to 60% by weight, advantageously from 20% to 50% by weight, of the total weight of the composition (P).

According to one embodiment, the composition of silylated polyurethanes preferably represents from 17% to 85% by weight of the weight of the composition (P), in particular when the composition (P) is intended to be used as adhesive composition and especially as pressure-sensitive adhesive composition.

According to another embodiment, the composition of silylated polyurethanes preferably represents from 10% to 85% by weight of the weight of the composition (P), in particular when the composition (P) is intended to be used as surface coating or mastic composition.

The composition (P) may or may not comprise at least one catalyst. When a catalyst is present, it can represent from 0.01% to 5% by weight, preferably from 0.1% to 3% by weight, more preferably from 0.5% to 2% by weight, of the total weight of the composition (P).

The catalyst used in the composition (P) according to the invention can be any catalyst known to a person skilled in the art for the condensation of silanol. Such a catalyst will be denoted by crosslinking catalyst. Mention may be made, as examples of such catalysts, of organic titanium derivatives, such as titanium acetylacetonate (available commercially under the name Tyzor® AA75 from DuPont), organic aluminum derivatives, such as the aluminum chelate (available commercially under the name K-KAT® 5218 from King Industries), or amines, such as 1,8-diazobicyclo[5.4.0]undec-7-ene or DBU.

The composition (P) may or may not comprise at least one tackifying resin. When at least one tackifying resin is present, the tackifying resin or resins can represent from 1% to 80% by weight, more preferably from 5% to 50% by weight and better still from 10% to 30% by weight, of the total weight of the composition (P).

According to one embodiment, the tackifying resin or resins preferably represent from 12% to 80% by weight of the weight of the composition (P), in particular when the composition (P) is intended to be used as adhesive composition and especially as pressure-sensitive adhesive composition.

According to another embodiment, the tackifying resin or resins preferably represent from 1% to 30% by weight of the weight of the composition (P) and are preferably chosen from the tackifying resins which are liquid at ambient temperature, in particular when the composition (P) is intended to be used as surface coating or mastic composition.

Preferably, a tackifying resin which is liquid at ambient temperature will be chosen, such as, for example, Sylvatac® RE 12, which is a resin of rosin ester type available from Arizona Chemical.

According to one embodiment, the tackifying resin exhibits a number-average molecular weight ranging from 100 Da to 5000 Da, preferably from 500 Da to 4000 Da.

According to one embodiment, the tackifying resin is chosen from:
(t1) resins capable of being obtained by polymerization of terpene hydrocarbons and of phenols, in the presence of Friedel-Crafts catalysts,
(t2) resins capable of being obtained by polymerization of α-methylstyrene, optionally by reaction with phenols,
(t3) rosins of natural origin or modified rosins, such as the rosin extracted from pine gum, wood rosin extracted from tree roots and their derivatives which are hydrogenated, dimerized, polymerized or esterified with monoalcohols or polyols, such as glycerol or pentaerythritol,
(t4) resins obtained by hydrogenation, polymerization or copolymerization (with an aromatic hydrocarbon) of mixtures of unsaturated aliphatic hydrocarbons having approximately 5, 9 or 10 carbon atoms resulting from petroleum fractions,
(t5) terpene resins generally resulting from the polymerization of terpene hydrocarbons, such as monoterpene (or pinene), in the presence of Friedel-Crafts catalysts,
(t6) copolymers based on natural terpenes, for example styrene/terpene, α-methylstyrene/terpene and vinyltoluene/terpene, and
(t7) acrylic resins.

Such resins are commercially available and, among those of types (t1), (t2) and (t3) defined above, mention may be made of the following products:
resins of type (t1): Dertophene® 1510 available from DRT having a number-average molecular weight Mn of approximately 870 Da; Dertophene® H150 available from the same company with a number-average molecular weight Mn equal to approximately 630 Da; Sylvarez® TP 95 available from Arizona Chemical having a number-average molecular weight Mn of approximately 1200 Da;
resins of type (t2): Norsolene® W100 available from Cray Valley, which is obtained by polymerization of α-methylstyrene without action of phenols, with a number-average molecular weight Mn of 900 Da; Sylvarez® 510, which is available from Arizona Chemical, with a number-average molecular weight Mn of approximately 1740 Da, the process for the production of which comprises the addition of phenols;
resins of type (t3): Sylvalite® RE 100, which is an ester of rosin and of pentaerythritol available from Arizona Chemical and with a number-average molecular weight Mn of approximately 1700 Da.

The composition (P) according to the invention may or may not comprise fillers, it being possible for said fillers to be inorganic fillers, organic fillers or a mixture of inorganic and organic fillers.

The inorganic fillers can be chosen from calcium carbonates, calcium polycarbonates, aluminum hydroxide, talcs, kaolins, carbon black, silicas and fumed silica, quartz or glass beads.

The organic fillers can be chosen from polyvinyl chloride, polyethylene, polyamide, styrene/butadiene resins or any other organic polymer in the powder form.

Preferably, the fillers exhibit a particle size ranging from 0.010 to 20 μm, preferably ranging from 0.020 to 15 μm, more preferably ranging from 0.030 to 5 μm, measurable, for example, by laser particle sizing.

The fillers can provide various functions within the composition (P), for example a rheological agent function.

The fillers can represent up to 80% by weight, preferably from 20% to 70% by weight, more preferably from 30% to 60% by weight, of the total weight of the composition (P).

Additives can be provided in order to adjust the rheology of the composition (P) according to the applicational constraints (rheological agents). For example, rheological agents which increases the yield point can be added in order to prevent sagging during the application of the composition (P), in particular when the surface receiving the layer of composition (P) is not horizontal.

The rheological agent or agents can represent from 0.01% to 8% by weight, preferably from 0.05% to 6% by weight and more preferably from 0.1% to 5% by weight, of the total weight of the composition (P).

The composition (P) according to the invention may or may not comprise at least one plasticizer. When it is present, the plasticizer can, for example, be chosen from esters of benzoic acid, phthalic acid, trimellitic acid, pyromellitic acid, adipic acid, sebacic acid, fumaric acid, maleic acid, itaconic acid or citric acid or from derivatives of polyester, of polyether, hydrocarbon mineral oil. Mention may be made, among esters of phthalic acid, of phthalates, such as dibutyl phthalate, dioctyl phthalate, dicyclohexyl phthalate, diisooctyl phthalate, diisodecyl phthalate, dibenzyl phthalate or butyl benzyl phthalate. If the plasticizer is present, it is preferably chosen from phthalates, sebacates, adipates and benzoates.

The plasticizer must be compatible with the composition of silylated polyurethanes according to the invention and not separate in the composition (P). The plasticizer makes it possible to increase the plasticity (elongation) of the composition (P) and to reduce its viscosity.

The content of plasticizer(s) is preferably less than or equal to 30% by weight and more preferably less than or equal to 15% by weight, with respect to the total weight of the composition (P). In particular, when at least one plasticizer is present, it can represent from 0.1% to 30% by weight and preferably from 0.5% to 15% by weight of the total weight of the composition (P).

The composition (P) according to the invention may or may not comprise at least one drying agent. When at least one drying agent is present, it can be chosen from vinyltrimethoxysilane (VTMO), such as Silquest® A171, available from Momentive, vinyltriethoxysilane (VTEO), such as Geniosil® GF 56, available from Wacker, or alkoxyarylsilanes, such as Geniosil® XL 70, available from Wacker.

The content of drying agent(s) is preferably less than or equal to 3% by weight and more preferably less than or equal to 2% by weight, with respect to the total weight of the composition (P). In particular, when at least one drying agent is present, it can represent from 0.5% to 3% by weight and preferably from 1% to 2% by weight of the total weight of the composition (P).

UV and/or heat stabilizers can be added to the composition (P) in order to prevent (slow down or stop) degradation of the silylated polymers and to result in a better resistance to UV radiation or to thermal shocks. Mention will be made, by way of examples, of UV screening agents and antioxidants, such as Tinuvin® 123, Tinuvin® 326 or Irganox® 245, available from BASF.

The composition (P) according to the invention may or may not comprise at least one adhesion promoter.

Mention may be made, as example of adhesion promoter which can be used in the composition (P) according to the invention, of aminosilanes.

According to one embodiment, the composition (P) is substantially devoid of solvent. Preferably, the composition (P) does not comprise solvent.

The composition (P) according to the invention can be prepared by mixing the composition of silylated polyurethanes according to the invention with the additional component or components at a temperature ranging from 10° C. to 90° C. When fillers and at least one catalyst are present in the composition (P) according to the invention, the catalyst or catalysts are preferably added in a second stage, after the mixing of the silylated polyurethane or polyurethanes and the fillers. The other additional component or components optionally present are introduced in accordance with the normal usages.

The composition (P) is not crosslinked before it is used, for example by application to a support. The composition (P) according to the invention is applied under conditions which make it possible to crosslink it. The crosslinking of the composition (P) has the effect of creating, between the polymeric chains of the silylated polyurethanes used according to the invention, under the controlled or uncontrolled action of moisture and of the temperature, bonds of siloxane type which result in the formation of a three-dimensional polymeric network.

According to one embodiment, when the composition (P) according to the invention is a mastic composition or a surface coating composition, it is stored in a pot, preferably in a sealed cartridge sheltered from the air and in particular from atmospheric moisture. Thus, a process for use of such a composition comprises the application of the composition (P) according to the invention to a surface, followed by the crosslinking of said composition (P).

The crosslinking of the composition (P) according to the invention is promoted by moisture, in particular by atmospheric moisture.

The composition (P) according to the invention can thus be applied to any type of surface, such as concrete, tiles, plaster, wood, plastics which can be in the form of films, metals of various natures, and the like.

Article

Another subject matter of the present patent application relates to an article comprising at least one support layer and at least one layer obtained by crosslinking of the composition (P) according to the invention.

According to one embodiment, the support layer can be a permanent support layer or else a temporary support layer, also known as a protective nonstick layer (release liner).

According to a preferred embodiment, the article according to the invention is a self-adhesive article comprising at least one support layer and at least one adhesive layer obtained by crosslinking a pressure-sensitive adhesive composition (P) according to the invention comprising at least one composition of polymers according to the invention, at least one tackifying resin and at least one crosslinking catalyst.

The tackifying resin and the crosslinking catalyst can be as described above.

The pressure-sensitive adhesive composition used for the formulation of the self-adhesive article according to the invention preferably comprises and in particular consists of:
  from 17% to 85% by weight, preferably from 27% to 75% by weight, more preferably from 37% to 65% by weight, of the composition of silylated polyurethanes according to the invention,
  from 12% to 80%, preferably from 22% to 70%, preferably from 32% to 60%, by weight, of tackifying resin(s), and
  from 0.01% to 5% by weight of crosslinking catalyst(s), optionally from 0.1% to 20%, preferably from 0.5% to 10%, more preferably from 1% to 3%, by weight, of additional component(s) chosen from adhesion promoters, plasticizers or diluents, rheological agents, drying agents, UV and/or heat stabilizers, and solvents, preferably from UV and/or heat stabilizers, plasticizers or diluents, drying agents and solvents,
  with respect to the total weight of the adhesive composition.

The support layer can be paper or a film of a polymeric material having one or more layers.

The support layer according to the invention can also be treated by any type of surface treatment, such as a corona treatment, making it possible in particular to increase the wettability.

According to one embodiment, the support layer can be a permanent support layer or else a temporary support layer, also known as a protective nonstick layer (release liner). Thus, the temporary support layer is intended to be removed before use (adhesive bonding) of the self-adhesive article.

The support layer can be covered on one of its two faces with a protective nonstick layer, for example with a silicone-treated paper sheet or a silicone-treated plastic film. In particular, the support layer can be covered on the back face, which is not coated with the adhesive layer, with a protective nonstick layer. In this way, the self-adhesive article can be wound around itself and then unwound without any problem by virtue of the absence of adhesion of the adhesive layer to the silicone-treated face.

According to one embodiment, the article, preferably the self-adhesive article, according to the invention can be prepared by a process comprising the following stages:
  (a) the conditioning of the composition (P), preferably of PSA type, according to the invention at a temperature ranging from 20 to 160° C.; then
  (b) the coating, by the composition (P) obtained in stage (a), of a carrying surface; then
  (c) the crosslinking of the coated composition (P), by heating the coated carrying surface at a temperature ranging from 20 to 200° C. under a humid atmosphere;
  optionally:
  (d) the lamination or the transfer of the layer of crosslinked composition (P) onto a support layer or onto a protective film, preferably of nonstick type.

"Carrying surface" should be understood as meaning, within the meaning of the present invention, either a belt conveyor covered with a nonstick layer or a support layer.

In the case where the composition (P) is a pressure-sensitive adhesive (PSA) composition and the carrying surface is a belt conveyor, the process for obtaining the self-adhesive article according to the invention comprises, in stage (d), the transfer of the crosslinked adhesive layer onto a support layer.

In the case where the composition (P) is a pressure-sensitive adhesive (PSA) composition and the carrying surface is a permanent support layer, the process for obtaining the self-adhesive article according to the invention can comprise, in stage (d), the lamination of the adhesive layer onto a protective nonstick layer.

According to the preferred embodiment in which the composition (P) is a pressure-sensitive adhesive (PSA) composition, the process for the manufacture of the self-adhesive article according to the invention additionally comprises a stage (e) of coating with a second layer of adhesive composition on the support layer, followed by a stage (f) of crosslinking the adhesive composition coated in stage (e) by heating at a temperature ranging from 20 to 200° C. under a humid atmosphere. According to this embodiment, a double-sided self-adhesive article is obtained.

The coating stage (b) can be carried out by means of known coating devices, such as, for example, a lip nozzle or a nozzle of curtain type, or also with a roller. It can employ a weight per unit area of adhesive composition in the crosslinked state ranging from 3 to 2000 $g/m^2$, preferably from 5 to 500 $g/m^2$, more preferably from 10 to 250 $g/m^2$.

Preferably, the coating is carried out uniformly over the support layer or over the protective nonstick layer but the coating can also be adapted to the desired shape of the final (self-adhesive) article.

According to one embodiment, the coating by the composition (P) is carried out over at least a portion of the two faces of the support layer. If the two faces of the support layer are coated, the composition (P) can be identical or different on the two faces and the weight per unit area can be identical or different on the two faces.

According to one embodiment, the coated composition (P) is additionally subjected, during stage (c), to a treatment in a humid atmosphere characterized by its humidity level. Preferably, the humid atmosphere is an atmosphere in which from 2% to 100% of the molecules are water molecules, preferably from 4% to 50%, more preferably from 5% to 10%, of the molecules are water molecules.

The humidity level is expressed as percentage of water per unit of volume, which corresponds to the number of water molecules divided by the total number of molecules in a unit of volume. By virtue of the linear nature of this scale, the humidity level is easily measured and monitored by using, for example, monitors of P.I.D (Proportional-Integral-Derivative) type. The percentage by weight can be calculated by multiplying the percentage of the number of water molecules with respect to the total number of molecules by a factor of 0.622. General information on the humidity level in various environments is described by W. Wagner et al. in "International Steam Tables—Properties of Water and Steam based on the Industrial Formulation IAPWS-IF97".

The time necessary for the crosslinking of stage (c) can vary within wide limits, for example between 1 second and 30 minutes, depending on the weight per unit area of adhesive composition deposited on the carrying surface, on the heating temperature and on the humidity.

This thermal crosslinking stage has the effect of creating—between the polymeric chains of the composition of polymers according to the invention and under the action of moisture—bonds of siloxane type which result in the formation of a three-dimensional polymeric network.

In the case where the composition (P) is a PSA composition, the composition (P) thus crosslinked is a pressure-sensitive adhesive which confers, on the support layer which is coated with it, the desired adhesiveness and the desired tack.

According to one embodiment of the invention, the self-adhesive article preferably comprises an adhesive layer over at least a portion of one face or of the two faces of the support layer, said adhesive layer or layers being optionally coated with a protective nonstick layer. According to one embodiment, the self-adhesive article comprises two protective nonstick layers on each of the two adhesive layers. In this case, the two protective layers can be made of identical or different materials and/or they can have an identical or different thickness.

The self-adhesive article according to the invention can be used in an adhesive bonding method comprising the following stages:
a) removing the protective nonstick film, when such a film is present;
b) applying the article to a surface; and
c) applying a pressure to said article.

EXAMPLES

The following ingredients were used in the examples:
Voranol® EP1900, available from Dow Chemical: polypropylene glycol (of diol type) with a number-average molecular weight of 3938 g/mol and a hydroxyl number OHN of 28.5 mgKOH/g;
Scuranate® TX, available from Vencorex Chemicals: mixture of 2,4-toluene diisocyanate and 2,6-toluene diisocyanate exhibiting a % NCO=48.1% (i.e., assaying at 48.1% weight/weight of —NCO group) and M=176 g/mol;
IPDI (isophorone diisocyanate) exhibiting a % NCO=37.6% (i.e., assaying at 37.6% weight/weight of —NCO group) and M=222.3 g/mol, available, for example, from Evonik;
Irganox® 245, available from BASF: antioxidant of hindered phenol type;
Borchi KAT® 0761, available from Borchers: catalyst based on zinc neodecanoate;
Borchi KAT® VP0244, available from Borchers: catalyst based on bismuth and zinc neodecanoate;
Silquest® A1110, available from Momentive: aminosilane, exhibiting a primary amine functional group, of formula $H_2N-(CH_2)_3-Si(OMe)_3$; M=179.3 g/mol;
Dynasylan® 1189, available from Evonik: aminosilane, exhibiting a secondary amine functional group, of formula $nBu-NH-(CH_2)_3-Si(OMe)_3$ (nBu represents a linear butyl radical); M=235 g/mol;
Voranol® P2000, available from Dow Chemical: polypropylene glycol (of diol type) with a number-average molecular weight of 2000 g/mol and a hydroxyl number OHN of 56 mgKOH/g;
Voranol® P400, available from Dow Chemical: polypropylene glycol (of diol type) with a number-average molecular weight of 400 g/mol and a hydroxyl number OHN of 264 mgKOH/g;
PPG 400, available from Aldrich: polypropylene glycol (of monoalcohol type) with a number-average molecular weight of 340 g/mol and a hydroxyl number OHN of 165 mgKOH/g;
Desmophen® 4042 BT, available from Covestro: polypropylene glycol (of triol type) with a number-average molecular weight of 4000 g/mol and a hydroxyl number OHN of 44 mgKOH/g;
K-KAT® 5218, from King Industries: catalyst of aluminum chelate type;
Dertophene® H150, available from DRT: tackifying resin of terpene phenolic type;
Irganox® 1010, available from BASF: antioxidant of hindered phenol type.

Ex. 1: Synthesis of Comparative Silylated Polyurethanes 1.1 Silylated Polyurethane Ref. 1
This polymer is prepared by the process described below in which the ratio (r2) $NCO/NH_2$ during the stage of addition of a silane, of aminosilane type, has the value 1, so that 100% of NCO functional groups react with the amine functional groups of the aminosilane during stage (ii). On conclusion of stage (ii), the product no longer comprises NCO functional groups.

85.71 g (42.78 mmol) of polyether polyol Voranol® EP1900 and 0.5 g of antioxidant Irganox® 245 are introduced into a closed 250 ml reactor equipped with a stirrer, heating means and a thermometer and connected to a vacuum pump. The assembly is heated to 85° C. and maintained at a reduced pressure of 20 mbar for 1 hour in order to make possible the dehydration. 30 mg of catalyst Borchi KAT® VP0244 and 7.02 g (80.39 mmol) of diisocyanate (Scuranate® TX) are then introduced into the reactor under a stream of nitrogen, the amounts introduced thus corresponding to a ratio (r1) NCO/OH equal to 1.88. The polyaddition reaction is continued for 2 h 30 until the OH functional groups have been completely consumed by the NCO functional groups. Approximately 37.61 mmol of excess NCO remain.

6.74 g (37.61 mmol) of the aminosilane Silquest® A-1110 are then added under a stream of nitrogen, corresponding to a ratio (r2) $NH_2/NCO$ equal to 1 (corresponding to a grafting of 100 mol % of the NCO functional groups by the $NH_2$ functional groups of the aminosilane). The polyaddition reaction is continued for 1 h until the NCO functional groups have been completely consumed by the $NH_2$ functional groups (detected by the disappearance of the —NCO band at 2300 cm$^{-1}$ in the infrared).

The viscosity at 23° C. of the composition obtained on conclusion of the synthesis process comprising a silylated polyurethane is 324 Pa·s.

1.2 Composition of Silylated Polyurethanes Ref. 2

This composition of silylated polyurethanes is prepared by the process described below in which, during stage (iii), a monol (monoalcohol) is added.

82.81 g (41.32 mmol) of polyether polyol Voranol® EP1900 and 0.5 g of antioxidant Irganox® 245 are introduced into a closed 250 ml reactor equipped with a stirrer, heating means and a thermometer and connected to a vacuum pump. The assembly is heated to 85° C. and maintained at a reduced pressure of 20 mbar for 1 hour in order to make possible the dehydration. 0.1 g of catalyst Borchi KAT® 0761 and 8.77 g (78.62 mmol) of IPDI are then introduced into the reactor under a stream of nitrogen, the amounts introduced thus corresponding to a ratio (r1) NCO/OH equal to 1.90. The polyaddition reaction is continued for 2 h 30 until the OH functional groups have been completely consumed by the NCO functional groups.

5.42 g (30.23 mmol) of the aminosilane Silquest® A-1110 are then added under a stream of nitrogen, corresponding to a ratio (r2) $NH_2$/NCO equal to 0.81 (corresponding to a grafting of 81 mol % of the NCO functional groups by the $NH_2$ functional groups of the aminosilane). The reactor is then maintained at a reduced pressure of 20 mbar at 85° C. for 1 hour until the grafting reaction is complete. Then, finally, in this last stage, 2.40 g (7.06 mmol) of polyether monol (PPG 400 from Aldrich) are introduced in order to graft at stoichiometry and to be given a ratio (r3) NCO/OH equal to 1. The polyaddition reaction is continued for 1 h until the NCO functional groups have been completely consumed by the OH functional groups (detected by the disappearance of the —NCO band at 2300 cm$^{-1}$ in the infrared).

The viscosity at 23° C. of the composition obtained on conclusion of the synthesis process comprising a mixture of silylated polyurethanes is 124 Pa·s.

The natures and the amounts of the ingredients for the 2 comparative examples Ref. 1 and Ref 2 are shown in table 1. The amounts of the ingredients are expressed as percentage by weight with respect to the total weight of the composition of silylated polyurethane(s) obtained on conclusion of the synthesis process.

In table 1, the different sequential stages of the process have been distinguished by stages (i), (ii) and, if appropriate, (iii), with the indication of the ratio (r1), of the ratio (r2) and, if appropriate, of the ratio (r3), said ratios being as defined in the present patent application. In table 1, the % NCO denotes the percentage by weight of NCO functional groups with respect to the total weight of the composition resulting from stage (i).

TABLE 1

Comparatives Ref. 1 and Ref. 2

|  |  | Ref. 1 | Ref. 2 |
|---|---|---|---|
| stage (i) | Voranol ® EP1900 | 85.71 | 82.81 |
|  | IPDI | — | 8.77 |
|  | Scuranate ® TX | 7.02 | — |
|  | Irganox ® 245 | 0.50 | 0.50 |
|  | Borchi KAT ® 0761 | — | 0.10 |
|  | Borchi KAT ® VP0244 | 0.03 | — |
|  | molar ratio (r1) NCO/OH | 1.9 | 1.9 |
|  | % NCO | 1.7 | 1.7 |

TABLE 1-continued

Comparatives Ref. 1 and Ref. 2

|  |  | Ref. 1 | Ref. 2 |
|---|---|---|---|
| stage (ii) | Silquest ® A1110 | 6.74 | 5.42 |
|  | molar ratio (r2) NCO/$NH_2$ | 1.0 | 1.3 |
| stage (iii) | PPG 400 | — | 2.40 |
|  | molar ratio (r3) NCO/OH | — | 1.0 |

Ex. 2: Synthesis of the Silylated Polyurethanes According to the Invention 2.1 Composition of Silylated Polyurethanes C1 According to the Invention A composition of silylated polyurethanes C1 according to the invention is prepared according to the following protocol:

73.05 g (36.46 mmol) of polyether polyol Voranol® EP1900 and 0.5 g of antioxidant Irganox® 245 are introduced into a closed 250 ml reactor equipped with a stirrer, heating means and a thermometer and connected to a vacuum pump. The assembly is heated to 85° C. and maintained at a reduced pressure of 20 mbar for 1 hour in order to make possible the dehydration. 30 mg of catalyst Borchi KAT® VP0244 and 5.98 g (68.48 mmol) of diisocyanate (Scuranate® TX) are then introduced into the reactor under a stream of nitrogen, the amounts introduced thus corresponding to a ratio (r1) NCO/OH equal to 1.88. The polyaddition reaction is continued for 2 h 30 until the OH functional groups have been completely consumed by the NCO functional groups.

4.34 g (24.05 mmol) of the aminosilane Silquest® A1110 are then added under a stream of nitrogen, corresponding to a ratio amine/NCO equal to 0.75 (corresponding to a grafting of 75 mol % of the NCO functional groups by the amine functional groups of the aminosilane), i.e. a ratio (r2) NCO/amine de 1.3. The polyaddition reaction is continued for 1 h until the NCO functional groups have been completely consumed by the amine functional groups. The last stage consists in targeting a ratio (r3) NCO/OH equal to 1 by grafting the 25 mol % of residual NCO functional groups by the OH functional groups of the polyether polyol by adding 16.10 g (8.036 mmol) of polyether polyol Voranol® EP1900. The reactor is then maintained at a reduced pressure of 20 mbar at 85° C. for 1 hour until the reaction is complete (complete consumption of the NCO functional groups by the OH functional groups detected by the disappearance of the —NCO band at 2300 cm$^{-1}$ in the infrared). The viscosity at 23° C. of the composition obtained on conclusion of the synthesis process comprising a mixture of silylated polyurethanes is 290 Pa·s.

2.2 Compositions of Silylated Polyurethanes C2 to C10 According to the Invention Compositions of silylated polyurethanes C2 to C10 according to the invention were prepared according to a protocol similar to that of the composition C1.

The natures and the amounts of the ingredients of the compositions C1 to C10 are given in table 2 below. The amounts of the ingredients are expressed as percentage by weight with respect to the total weight of the composition of silylated polyurethanes obtained on conclusion of the synthesis process.

In table 2, the different sequential stages of the process have been distinguished by stages (i), (ii) and (iii), with the indication of the ratio (r1), of the ratio (r2) and of the ratio (r3), said ratios being as defined in the present patent application.

In table 2, the % NCO denotes the percentage by weight of NCO functional groups with respect to the total weight of the composition resulting from stage (i).

TABLE 2

Compositions C1 to C10 according to the invention (as percentage by weight)

| | | C1 | C2 | C3 | C4 | C5 | C6 | C7 | C8 | C9 | C10 |
|---|---|---|---|---|---|---|---|---|---|---|---|
| stage (i) | Voranol® EP1900 | 73.05 | 85.46 | 60.51 | 72.16 | 67.32 | 58.08 | 78.29 | 75.51 | 74.09 | 77.97 |
| | Scuranate® TX | 5.98 | 7.00 | 5.00 | 5.91 | 5.51 | 4.76 | 6.42 | 6.18 | — | 6.38 |
| | IPDI | — | — | — | — | — | — | — | — | 7.85 | — |
| | Irganox® 245 | 0.50 | 0.50 | 0.50 | 0.50 | 0.50 | 0.50 | 0.50 | 0.50 | 0.45 | 0.50 |
| | Borchi KAT® 0761 | — | — | — | — | — | — | — | — | 0.09 | — |
| | Borchi KAT® VP0244 | 0.03 | 0.03 | 0.03 | 0.03 | 0.03 | 0.03 | 0.03 | 0.03 | — | 0.03 |
| | ratio (r1) NCO/OH | 1.9 | 1.9 | 1.9 | 1.9 | 1.9 | 1.9 | 1.9 | 1.9 | 1.9 | 1.9 |
| | % NCO | 1.7 | 1.7 | 1.7 | 1.7 | 1.7 | 1.7 | 1.7 | 1.7 | 1.7 | 1.7 |
| stage (ii) | Silquest® A1110 | 4.34 | 5.10 | — | — | — | — | — | — | 4.85 | — |
| | Dynasylan® 1189 | — | — | 2.51 | 5.61 | 5.24 | 4.52 | 6.09 | 5.87 | — | 6.46 |
| | ratio (r2) NCO/amine | 1.3 | 1.3 | 2.5 | 1.3 | 1.3 | 1.3 | 1.3 | 1.3 | 1.2 | 1.3 |
| stage (iii) | Voranol® EP1900 | 16.10 | — | 31.59 | 15.79 | 21.40 | 32.11 | — | — | 12.67 | — |
| | Voranol® P2000 | — | — | — | — | — | — | 8.67 | 11.91 | — | — |
| | Voranol® P400 | — | 1.91 | — | — | — | — | — | — | — | — |
| | Desmophen® 4042 BT | — | — | — | — | — | — | — | — | — | 8.66 |
| | ratio (r3) NCO/OH | 1.0 | 1.0 | 1.0 | 1.0 | 0.7 | 0.4 | 1.0 | 0.7 | 1.0 | 1.0 |

Ex. 3: Evaluation of the Performance Qualities of the Compositions of Silylated Polyurethane(s) Prepared
Measurement of the Crosslinking Time, Also Known as Skinning Time
For each of the compositions (Ref. 1, Ref. 2 and C1 to C10), the time for formation of a skin at the surface of a film at 120° C. in a chamber climatically controlled at 23° C. and 50%+/−5% relative humidity is measured according to the following method.
In a first step, an approximate measurement of the skinning time is produced. For this:
A heating plate is preheated to 120° C. (±5° C.) at least 30 minutes before use.
A 5 g sample consisting to 98% by weight of the composition of silylated polyurethane(s) to be tested and to 2% by weight of crosslinking catalyst K-KAT® 5218, with respect to the total weight of said sample, is weighed into an aluminum dish.
It is confirmed that the surface temperature of the plate is at 120° C. (with an IR gun).
The dish containing the sample described above is placed on the heating plate at 120° C.
the stopwatch is started.
Every 30 seconds, a metal point (awl, nail, pen, paper clip, and the like) is superficially driven in at the surface of the sample. A very thin string is formed which stretches greatly when the skinning time (ST) (which corresponds to the start of formation of a skin at the surface) approaches, the string is converted into a small tube which very rapidly breaks. It is considered that the skin is formed when the metal point is moved from left to right without breaking this tube adhesively bonded to the point.
It is regularly confirmed, using an IR gun, if the temperature of the samples and of the heating plate is homogeneous.
then, in a second step, three additional measurements are carried out in order to refine the measurement of the skinning time obtained by the first assessment. For this, for each of the additional measurements, the procedure as above is carried out, a fresh 5 g sample being prepared from the same composition of silylated polyurethane(s) and from the same crosslinking catalyst. The dish containing the sample is placed on a heating plate at 120° C. and then the stopwatch is started. 30 seconds before the ST found during the first test, the surface of the sample is checked every 5 seconds as above until the exact ST of the sample is determined.
The mean skinning time of the sample, expressed in minutes or seconds, is recorded: mean skinning time ST±3×σ, where σ represents the standard deviation (which corresponds to a confidence interval of 99.9%).
Measurement of the Viscosity
The viscosity was determined at 23° C. one day after the manufacture of the composition of silylated polyurethanes (D+1) and the viscosity was determined at 23° C. after aging, that is to say after storage of the composition of silylated polyurethanes at 60° C. for 48 h. The measurement of the viscosity after aging makes it possible to evaluate the stability of the viscosity.
Measurement of the Mechanical Properties
For each of the compositions (Ref. 1, Ref. 2 and C1 to C10), the elongation at break and the breaking stress were measured according to the methods described below:
Measurement of the breaking stress and of the elongation at break by tensile testing:
The principle of the measurement consists in drawing, in a tensile testing device, the movable jaw of which moves at a constant rate equal to 100 mm/minute, a standard test specimen consisting of the crosslinked composition and in recording, at the moment when the test specimen breaks, the tensile stress applied (in MPa) and also the elongation of the test specimen (in %).
The standard test specimen is dumbbell-shaped, as illustrated in the international standard ISO 37. The narrow part of the dumbbell used has a length of 20 mm, a width of 4 mm and a thickness of 300 μm.

In order to prepare the dumbbell, the composition of silylated polyurethane(s) is applied, in the liquid state, to an A4 sheet of silicone-treated paper with a Mayer bar in order to obtain an adhesive layer having a thickness of 300 μm which is left at 23° C. and 50% relative humidity for 2 weeks for the crosslinking thereof. The dumbbell is then obtained by simply cutting out from the crosslinked adhesive layer. The results of these combined measurements are shown in table 3 below.

TABLE 3

Evaluation of the compositions of silylated polyurethane(s)

|  | Viscosity at 23° C. at D + 1 (Pa · s) | Viscosity at 23° C. after aging at 60° C. for 2 days (Pa · s) | Crosslinking time at 120° C. (s) | Elongation at break (%) | Breaking stress (MPa) |
| --- | --- | --- | --- | --- | --- |
| Ref. 1 | 324 | 340 | 159 | 82 | 1.20 |
| Ref. 2 | 124 | 129 | 195 | 221 | 1.05 |
| C1 | 290 | 300 | 85 | 113 | 0.72 |
| C2 | 144 | 138 | 93 | 145 | 1.25 |
| C3 | 594 | 625 | 68 | 200 | 0.32 |
| C4 | 78.8 | 88 | 70 | 237 | 0.90 |
| C5 | 63.8 | 104 | 70 | 113 | 0.43 |
| C6 | 173 | 348 | 155 | 140 | 0.43 |
| C7 | 33.3 | 42 | 68 | 182 | 0.76 |
| C8 | 44 | 72 | 70 | 158 | 0.67 |
| C9 | 122 | 154 | 155 | 146 | 0.70 |
| C10 | 74 | 78 | 105 | 220 | 0.81 |

Table 3 above shows that the compositions C1 to C10 according to the invention exhibit lower crosslinking times and thus higher crosslinking rates than the comparative compositions Ref. 1 and Ref. 2. Specifically, the composition Ref. 2 obtained according to a process where, during the third stage, a monol is added (and not a diol, as required by the present invention) exhibits a lower crosslinking rate than the compositions C1 to C10 according to the invention.

This improvement in the crosslinking rate of the compositions of silylated polyurethanes of the invention was demonstrated over a broad sample group of compositions, exhibiting varied mechanical performance qualities. In fact, the compositions of silylated polyurethanes according to the invention can advantageously be employed in a large number of applications, as mentioned in the present patent application.

It may also be noted that the amount of polyol (G) added in stage (iii) has an influence on the stability of the viscosity. Thus, the viscosity will become more stable as the ratio (r3) approaches 1. In particular, the compositions C1-C4, C7 and C9-C10, for which the ratio (r3) has the value 1, are the most stable thermally.

Ex. 4: Preparation and Test on Self-Adhesive Articles 4.1. Different adhesive compositions of PSA type were prepared according to the protocol below. Each adhesive composition of PSA type comprises 51.2% by weight of a composition of silylated polyurethane(s) (Ref. 1, C1, C4, C8 or C9), 46% by weight of a tackifying resin (Dertophene® H150), 0.8% by weight of antioxidant of hindered phenol type (Irganox® 1010, available from BASF) and 2% by weight of a crosslinking catalyst (K-KAT® 5218), with respect to the weight of the adhesive composition.

The adhesive composition of PSA type is prepared by first of all introducing the tackifying resin Dertophene® H150 into a glass reactor under vacuum and heated to approximately 160° C. Then, once the resin is fully melted, the composition of silylated polyurethane(s) and the antioxidant are added.

The mixture is stirred under vacuum for 15 minutes and then cooled to 70° C. The catalyst (K-KAT® 5218) is then introduced. The mixture is kept under vacuum and with stirring for an additional 10 minutes.

4.2 The self-adhesive articles are subsequently prepared from the adhesive composition of PSA type and from a PET support layer according to the protocol described below, with a weight per unit area of the order of 50 g/m².

A rectangular support layer of polyethylene terephthalate (PET) with a thickness of 50 μm and with dimensions of 20 cm by 40 cm is used.

The adhesive composition of PSA type obtained in section 4.1 is preheated to a temperature of approximately 100° C. and is introduced into a cartridge, from where a strand is extruded which is deposited close the edge of the support layer parallel to its width.

The composition included in this strand is subsequently distributed over the whole of the surface of the support layer, so as to obtain a uniform layer of substantially constant thickness. Use is made, for this, of a film drawer (also known as film applicator) which is moved from the edge of the sheet to the opposite edge. A layer of composition corresponding to a weight per unit area of 50 g/m² is thus deposited, which represents a thickness of the order of approximately 50 μm. The PET support layer thus coated is then placed in an oven at 120° C. and approximately 5% relative humidity for 5 minutes in order to make possible the crosslinking of the composition and then laminated on a protective nonstick layer which is rectangular and of the same dimensions.

The PET support layer thus obtained is subjected to the tests described below.

4.3 The performance qualities are evaluated 7 days after preparation of the article (D+7) according to the protocols described below.

180° Peel Test on a Sheet of Stainless Steel

The adhesiveness is evaluated by the 180° peel test on a sheet of stainless steel, as described in the FINAT No. 1 method, published in the FINAT Technical Handbook, 6th edition, 2001. FINAT is the International Federation for Self-Adhesive Label Manufacturers and Converters. The principle of this test is as follows:

A test specimen in the form of a rectangular strip (25 mm×175 mm) is cut out from the PET support layer coated with the crosslinked adhesive composition obtained above. This test specimen is attached over ⅔ of its length (after removal of the corresponding portion of protective nonstick layer) to a substrate consisting of a sheet of stainless steel. The assembly obtained is left at ambient temperature for 20 minutes. It is then placed in a tensile testing device capable, starting from the end of the rectangular strip which has remained free, of carrying out the peeling or detachment of the strip under an angle of 180° and with a rate of separation of 300 mm per minute. The device measures the force required to detach the strip under these conditions.

The results are expressed in N/cm and are shown in table 4.

Tack Test (Also Known as Loop Test)

The tack is evaluated by the "loop" tack test described in the FINAT No. 9 method, the principle of which is as follows:

A test specimen in the form of a rectangular strip (25 mm×175 mm) is cut out from the PET support layer coated with the crosslinked adhesive composition obtained above. After removing all of the protective nonstick layer, the 2 ends of this strip are joined so as to form a loop, the adhesive layer of which is directed toward the outside. The 2 joined ends are placed in the movable jaw of a tensile testing device capable of imposing a rate of displacement of 300 mm/minute along a vertical axis with to-and-fro possibility. The lower part of the loop placed in the vertical position is first brought into contact with a horizontal sheet of glass of 25 mm by 30 mm over a square region with a side length of approximately 25 mm Once this contact has occurred, the direction of displacement of the jaw is reversed. The tack is the maximum value of the force necessary for the loop to become completely detached from the sheet.

The results are expressed in $N/cm^2$ and are shown in table 4.

TABLE 4

| Tests on the self-adhesive articles | | | | | |
|---|---|---|---|---|---|
|  | Ref. 1 | C1 | C4 | C8 | C9 |
| 180° C. peel (D + 7) (N/cm) | 9.4 | 10.2 | 19.6 | 15.7 | 8.5 |
| Tack (D + 7) (N/cm²) | 1.1 | 4.0 | 3.5 | 3.4 | 3.4 |

It was observed that the self-adhesive articles based on a composition of silylated polyurethanes C1, C4, C8 or C9 according to the invention exhibit very good performance qualities overall. In particular, they exhibit a peel strength comparable to, indeed even greater than (up to approximately 2 times greater than), that measured on the article obtained from the reference composition. In addition, the self-adhesive articles according to the invention exhibit a better tack (the tack being up to approximately 4 times greater than the value measured on the article obtained from the reference composition).

The invention claimed is:

1. A process for the synthesis of a composition of silylated polyurethanes (A), said process comprising the following sequential stages:
   i. polyaddition of at least one polyol (B) with at least one diisocyanate (C), in which the ratio (r1) of the number of NCO functional groups to the total number of OH functional groups, and of NH and $NH_2$ functional groups optionally present, is strictly greater than 1;
   ii. reacting the composition obtained in stage (i) with at least one silane (E) selected from the group consisting of aminosilanes (E1) and mercaptosilanes (E2), wherein the ratio (r2) of the number of NCO functional groups to the number of amine and/or thiol functional groups ranges from 1.1 to 5;
   iii. reacting the composition resulting from stage (ii) with at least one compound (G), wherein the compound (G) is selected from diols having a number average molecular weight ranging from 600 to 20,000 g/mol, and wherein during stage (iii), the ratio (r3) of the number of NCO functional groups to the number of alcohol functional groups is greater than or equal to 0.6 and less than or equal to 1.

2. The synthesis process as claimed in claim 1, in which, during stage (iii), the ratio (r3) of the number of NCO functional groups to the number of alcohol functional groups is greater than or equal to 0.7 and less than or equal to 1.

3. The synthesis process as claimed in claim 1, wherein the silane (E) exhibits the following structure:

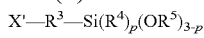

wherein:
X' represents an $NH_2$, $NHR^7$ and/or SH group,
$R^7$ represents a linear, branched or cyclic alkyl radical having from 1 to 12 carbon atoms or an alkenyl radical having from 2 to 12 carbon atoms or an aryl radical having from 6 to 12 carbon atoms,
$R^3$ represents a linear or branched divalent alkylene radical comprising from 1 to 6 carbon atoms,
$R^4$ and $R^5$, which are identical or different, each represent a linear or branched alkyl radical comprising from 1 to 4 carbon atoms; two $-OR^5$ groups can optionally be involved in one and the same ring,
p represents an integer equal to 0, 1 or 2.

4. The synthesis process as claimed in claim 1, in which the compound (G) exhibits a number-average molecular weight ranging from 100 g/mol to 80 000 g/mol.

5. The process of claim 1, wherein the compound (G) is selected from diols having a number average molecular weight ranging from 1500 to 10,000 g/mol, and wherein during stage (iii), the ratio (r3) of the number of NCO functional groups to the number of alcohol functional groups is greater than or equal to 0.6 and less than or equal to 1.

6. The synthesis process as claimed in claim 1, in which, during stage (iii), the ratio (r3) of the number of NCO functional groups to the number of alcohol functional groups is greater than or equal to 0.8 and less than or equal to 1.

7. The synthesis process as claimed in claim 1, in which, during stage (iii), the ratio (r3) of the number of NCO functional groups to the number of alcohol functional groups is greater than or equal to 0.9 and less than or equal to 1.

* * * * *